United States Patent
Dejong et al.

(10) Patent No.: US 11,610,167 B2
(45) Date of Patent: Mar. 21, 2023

(54) COMPUTER STORAGE SYSTEM

(71) Applicant: Target Brands, Inc., Minneapolis, MN (US)

(72) Inventors: Jonathan Dejong, Minneapolis, MN (US); Aaron Zirbes, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 41 days.

(21) Appl. No.: 16/675,002

(22) Filed: Nov. 5, 2019

(65) Prior Publication Data

US 2020/0167711 A1   May 28, 2020

Related U.S. Application Data

(60) Provisional application No. 62/772,483, filed on Nov. 28, 2018.

(51) Int. Cl.
| | |
|---|---|
| *G06Q 10/0631* | (2023.01) |
| *G06Q 10/087* | (2023.01) |
| *G06Q 50/28* | (2012.01) |
| *G06Q 10/1093* | (2023.01) |
| *G06Q 30/0601* | (2023.01) |

(52) U.S. Cl.
CPC . *G06Q 10/06316* (2013.01); *G06Q 10/06315* (2013.01); *G06Q 10/087* (2013.01); *G06Q 10/1097* (2013.01); *G06Q 30/0635* (2013.01); *G06Q 50/28* (2013.01)

(58) Field of Classification Search
CPC .............................................. G06Q 10/06316
See application file for complete search history.

(56) References Cited

U.S. PATENT DOCUMENTS

| | | | |
|---|---|---|---|
| 5,936,860 A | 8/1999 | Arnold et al. | |
| 7,912,574 B2* | 3/2011 | Wurman | G06Q 10/087 700/213 |
| 9,111,251 B1* | 8/2015 | Brazeau | G06Q 10/087 |
| 9,216,857 B1* | 12/2015 | Kalyan | G06Q 10/087 |
| 9,801,517 B2* | 10/2017 | High | G05D 1/0276 |
| 9,829,333 B1* | 11/2017 | Calder | G08G 1/166 |
| 10,026,044 B1* | 7/2018 | Wurman | G06Q 10/047 |

(Continued)

OTHER PUBLICATIONS

José Antonio Larco et al, Managing warehouse efficiency and worker discomfort through enhanced storage assignment decisions, International Journal of Production Research, vol. 55, No. 21, 6407-6422 (Year: 2016).*

(Continued)

*Primary Examiner* — Andre D Boyce
(74) *Attorney, Agent, or Firm* — Fish & Richardson P.C.

(57) ABSTRACT

In some implementations, a warehouse management system is used. An order manager receives an order requiring an item to be moved to a first physical location. Data of the order is stored. The data for the order is accessed. A target item matching the required item to be moved is identified. Data representing a logical location of a target item is accessed. The workload manager identifies based on the data representing the logical location of the target item one or more tasks that are configured to move the target item to the first location. The tasks can be performed to move the target items to the first location.

16 Claims, 11 Drawing Sheets

(56) References Cited

U.S. PATENT DOCUMENTS

| | | | | |
|---|---|---|---|---|
| 10,209,711 | B1* | 2/2019 | Brazeau | G06N 20/00 |
| 10,471,597 | B1* | 11/2019 | Murphy | B65G 1/1378 |
| 2005/0261954 | A1 | 11/2005 | Aoyama et al. | |
| 2014/0100999 | A1* | 4/2014 | Mountz | G06Q 10/087 |
| | | | | 705/28 |
| 2014/0279294 | A1 | 10/2014 | Field-Darragh et al. | |
| 2015/0307278 | A1* | 10/2015 | Wickham | G05B 15/02 |
| | | | | 700/216 |
| 2016/0101940 | A1* | 4/2016 | Grinnell | G05D 1/0297 |
| | | | | 700/216 |
| 2016/0145045 | A1* | 5/2016 | Mountz | B65G 1/137 |
| | | | | 700/216 |
| 2017/0024804 | A1 | 1/2017 | Tepfenhart et al. | |
| 2017/0088360 | A1* | 3/2017 | Brazeau | B65G 31/00 |
| 2017/0166399 | A1* | 6/2017 | Stubbs | B65G 1/1373 |
| 2017/0371322 | A1* | 12/2017 | Lake | G01S 5/00 |
| 2018/0025310 | A1* | 1/2018 | Gabbai | G06Q 10/087 |
| | | | | 705/28 |
| 2018/0053141 | A1* | 2/2018 | Shydo, Jr. | G05D 1/0291 |
| 2018/0068255 | A1* | 3/2018 | Hance | B65G 57/03 |
| 2018/0082162 | A1* | 3/2018 | Durham | G06Q 50/28 |
| 2018/0082244 | A1* | 3/2018 | Brazeau | G06T 7/73 |
| 2018/0158016 | A1* | 6/2018 | Pandya | G05B 19/41895 |
| 2018/0247404 | A1* | 8/2018 | Goyal | G06K 9/6202 |
| 2018/0322424 | A1* | 11/2018 | Wurman | G06Q 10/047 |
| 2019/0310655 | A1* | 10/2019 | Voorhies | B66F 9/063 |
| 2019/0378232 | A1* | 12/2019 | Goren | G06Q 10/04 |

OTHER PUBLICATIONS

Felix T.S. Chan et al., Improving the productivity of order picking of a manual-pick and multi-level rack distribution warehouse through the implementation of class-based storage, Expert Systems with Applications 38 (2011) 2686-27002687 (Year: 2011).*

Eric H. Grosse et al., Incorporating human factors in order picking planning models: framework and research opportunities, International Journal of Production Research, 2015, vol. 53, No. 3, 695-717 (Year: 2015).*

* cited by examiner

| Record ID | Container/Item | Containing Container |
|---|---|---|
| 126D8A | Container | 3F896F |
| 126D8B | Container | 126D8A |
| 126D8C | Item | 126D8B |
| ... | ... | ... |

Warehouse Data System 208

COMPUTER STORAGE SYSTEM

CROSS-REFERENCE TO RELATED APPLICATIONS

This application claims the benefit of U.S. Provisional Application Ser. No. 62/772,483, filed Nov. 28, 2018. The disclosure of the prior application is considered part of (and is incorporated by reference in) the disclosure of this application.

TECHNICAL FIELD

This document generally relates to architecture of computer systems.

BACKGROUND

Computers are devices that accept data input, process the data, and provide data output using hardware and software.

Warehouse management systems (WMS) have been developed and used to manage warehouses and supply chains, including managing the movement of inventory.

WMS have traditionally been tightly coupled to the physical environment within the warehouse and the physical resources available to the warehouse, such as equipment (e.g., forklifts), workers, layouts, etc.

SUMMARY

This document generally describes WMS that are decoupled from the physical environment within a warehouse, the physical inventory, and the physical warehouse resources (e.g., workers, trucks), permitting it to more efficiently and effectively perform warehouse management operations within a warehouse. For example, warehouses and their entire inventory can be abstracted out to being represented as containers and items, where each container can include one or more other containers, or one or more items. As a result, the physical layout of a warehouse and all of its contents can be represented by nested relationships of containers and items that provide enough information to effectively manage the warehouse, yet are decoupled from the specific physical environment within the warehouse.

In one aspect, a method for operating components of a warehouse management system is used. The method includes receiving, by an order manager, an order requiring an item to be moved to a first physical location. The method further includes storing data of the order in a data system that is in data communication with the order manager. The method further includes accessing, by a workload manager, the data for the order. The method further includes identifying, in the data for the order, a target item matching the required item to be moved to the first location. The method further includes accessing, from the data system, data representing a logical location of a target item. The method further includes generating, by the workload manager and based on the data representing the logical location of the target item, one or more tasks that are configured to move the target item to the first location. The method further includes causing the tasks to be performed Implementations can include any, all, or none of the following features. The data representing the logical location of the target item includes a sequence of a history of the item, from which the container hierarchy in which the item exists logically can be derived. The data representing the logical location of the target item includes no data explicitly indicating the physical location of the target item. Data representing the logical location of the target items is managed in the data system by a warehouse manager that is in data communication with the warehouse data system and not in data communication with the workload manager. Generating, by the workload manager and based on the data representing the logical location of the target item, one or more tasks that are configured to move the target item to the first location includes generating, for each of the tasks, a record in the warehouse data system that identifies at least one action to be performed for the task. The method including causing data of the task to be displayed to a user that is to complete the corresponding task. The method further including pooling the order with other orders into an order pool to be performed together. The task includes a tree of actions to be performed to perform the task.

In one aspect, a system includes a processor. The system further includes computer memory containing instructions that, when executed with the processor, cause the system to perform operations including receiving, by an order manager, an order requiring an item to be moved to a first physical location. The operations further include storing data of the order in a data system that is in data communication with the order manager. The operations further include accessing, by a workload manager, the data for the order. The operations further include identifying, in the data for the order, a target item matching the required item to be moved to the first location. The operations further include accessing, from the data system, data representing a logical location of a target item. The operations further include generating, by the workload manager and based on the data representing the logical location of the target item, one or more tasks that are configured to move the target item to the first location. The operations further include causing the tasks to be performed.

Implementations can include any, all, or none of the following features. The data representing the logical location of the target item includes a sequence of a history of the item, from which the container hierarchy in which the item exists logically can be derived. The data representing the logical location of the target item includes no data explicitly indicating the physical location of the target item. Data representing the logical location of the target items is managed in the data system by a warehouse manager that is in data communication with the warehouse data system and not in data communication with the workload manager. Generating, by the workload manager and based on the data representing the logical location of the target item, one or more tasks that are configured to move the target item to the first location includes generating, for each of the tasks, a record in the warehouse data system that identifies at least one action to be performed for the task. The system including causing data of the task to be displayed to a user that is to complete the corresponding task. The system including pooling the order with other orders into an order pool to be performed together. The task includes a tree of actions to be performed to perform the task.

In one aspect, a non-transitory computer-readable medium containing instructions that, when executed with a processor, cause the performance of operations including receiving, by an order manager, an order requiring an item to be moved to a first physical location. The operations further include storing data of the order in a data system that is in data communication with the order manager. The operations further include accessing, by a workload manager, the data for the order. The operations further include identifying, in the data for the order, a target item matching the required item to be moved to the first location. The operations further include accessing, from the data system, data representing a logical location of a target item. The operations further include generating, by the workload manager and based on the data representing the logical location of the target item, one or more tasks that are configured to move the target item to the first location. The operations further include causing the tasks to be performed.

Implementations can include any, all, or none of the following features. Generating, by the workload manager and based on the data representing the logical location of the target item, one or more tasks that are configured to move the target item to the first location includes generating, for each of the tasks, a record in the warehouse data system that identifies at least one action to be performed for the task. The medium including causing data of the task to be displayed to a user that is to complete the corresponding task. The task includes a tree of actions to be performed to perform the task.

The systems, devices, program products, and processes described throughout this document can, in some instances, provide one or more of the following advantages. By decoupling elements of a WMS, those elements can be advantageously and more easily designed and upgraded. As such, the technology of computer systems is advanced. Indirect communication where one element of the system is not blocked while waiting for a response from another element allows for less complex design and greater robustness in the face of system errors, network slowdowns, etc. By using a logical location for items and containers tracked by a WMS, a single unified data model can be used for physical locations and objects with very different properties.

DESCRIPTION OF DRAWINGS

FIGS. 3A and 3B are diagram of an example of data used by a warehouse management system.

Like reference symbols in the various drawings indicate like elements

DETAILED DESCRIPTION

This document describes a warehouse management system (WMS) that includes (a) an inventory management system, (b) a workload management system, and (c) a task management system that are each logically and procedurally independent of each other. Each component may retain and modify data for its own use and may publish that data to other components for consumption but no component modifies the internal data of another component nor is synchronously dependent upon the data modification. Such independence among these components can provide a variety of advantages, including the ability to readily scale each of the components independent of each other, to swap in/out different iterations and versions of each component, and other design/management independence among the components.

For example, these components can operate in a service-oriented architecture that allows for greater flexibility in upgrading and changing the system as time goes forward. Because each unit is self-contained and only communicates through established interfaces, they may be replaced by a new unit without notification or modification of other units. This allows the system to more easily grow as business needs change.

Figure 1:
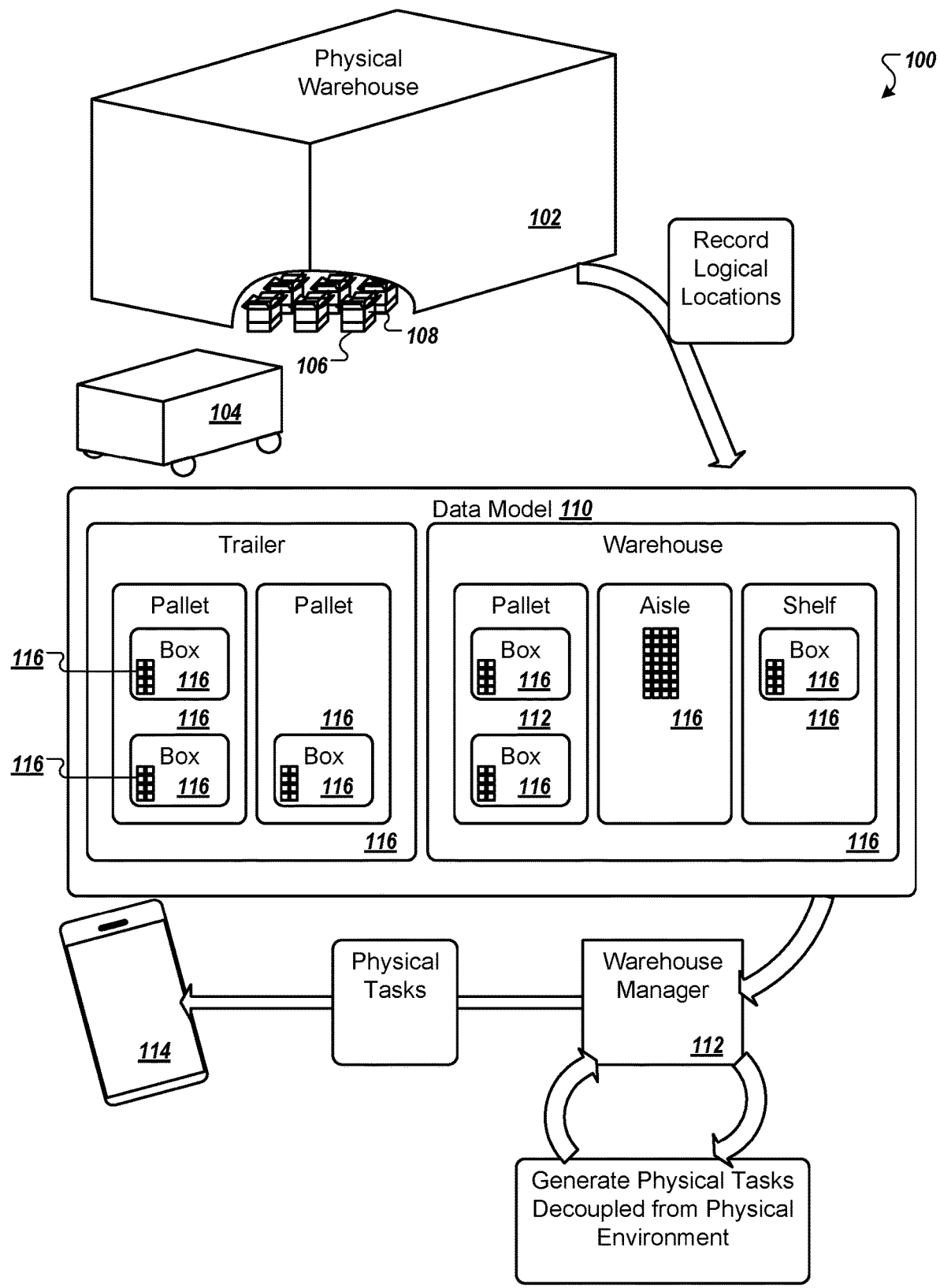
FIG. 1 is a diagram of an example system used in the management of warehouses.

FIG. 1 is a diagram of an example system 100 used in the management of warehouses. In the system 100, data about the status of items in a retail supply chain are tracked and tasks are generated in order to support the function of the retail system. However, a system like the system 100 can be used for any purpose that includes tracking and moving or supplying items at times and places where needed including the distribution of humanitarian aid, military equipment, manufacturing parts, etc.

A physical warehouse 102 and a trailer 104 are two example physical containers used to physically house items that are moved through a supply chain. The warehouse 102 is a stationary permanent building where items are received, stored, and shipped from. The trailer 104 is a mobile structure that can be attached to a truck and transported over roadways. Other example physical containers include shipping containers, train cars, oceanic ships, box trucks, etc.

Other types of physical container include a pallet 106 and a box 108. A pallet 106 is a structure often made of wood or plastic onto which boxes 108 can be stacked and moved with a pallet jack, forklift, etc. Other example physical containers can include bins, bags, dollies, aisles, shelfs, forklifts, pallet jacks, etc.

As can be seen, a physical container can take a wide variety of shapes and sizes. Physical containers can store items and, in some but not all cases, other containers. For example, a toothbrush (an item) can be bundled in a bag (a container) with other toothbrushes (other items). The bag can be stored in the box 108 (a container) on the pallet 106 (a container) in the warehouse 102 (a container) or in the trailer 104 (a container.)

As with any physical object, the physical containers and items can be recognized as having many types of physical properties. Such physical properties include color, weight, size, etc. Physical objects can have recognized physical locations such as latitude and longitude coordinates, an X, Y, and Z location within a building, etc. However, the physical attribution of containers is separated logically from the container tree that models the logical relationships between containers. For example, the toothbrush mentioned above may have a logical location of within bag #2 within box #6 within (or on) pallet #3 within warehouse #2 and that relationship is external to the specific coordinates of any given container.

In order to represent these logical locations, a data model 110 can be recorded. The data model 110 can include data collected and stored on computer systems that allow software to understand logical locations of containers and items within a supply chain. In this example, the data model includes records 116 for physical containers and for items within containers. As shown here, the trailer 104 has a corresponding record in the data model 110. Pallets and boxes within the trailer have corresponding records 116 for items within the boxes. Similarly, there are records 116 for the warehouse 102, the pallets 106, and the boxes 108 and for aisles, shelfs, and items within the warehouse 102.

A warehouse manager 112 can use the data model 110 to generate physical tasks using instructions that are decoupled from the physical environment. For example, the warehouse manager 112 can reference containers and items using the relative location of records 112. These physical tasks can include instructions to pick, move, and place items or containers. For example, a physical task may include instructions to pick the bag of toothbrushes out of the box in which they are located, to remove the toothbrushes from the bag, and to place the toothbrushes into various shipping envelopes. In another example, a physical task may instruct a user to use a pallet jack to remove a pallet from the trailer 104 and move the pallet to the physical warehouse 102.

When a physical task is generated, the physical task may reference the items and containers by their logical location. That is, the physical task may be reference the toothbrushes as being in the warehouse, in a particular row, in a particular pallet, in a particular box etc. The physical task may include instructions to take particular actions such as pick (pick an item or container up), place (placing the picked item in another logical location), etc.

The physical tasks can be transmitted to devices 114 for completion. For example, tasks assigned to human recipients can be sent to mobile computing devices such as cell phones or tablets for display to the human recipients. The tasks can then be formatted in a human-readable display that shows the human recipient what actions are being requested and for which items or containers. In particular, the display can reference the items using their logical locations. In some implementations, the physical tasks can be transmitted to computer-controlled equipment. For example, an automated conveyor belt or pallet-moving robot can be instructed to move a container or item from one logical location to another logical location.

Figure 2:
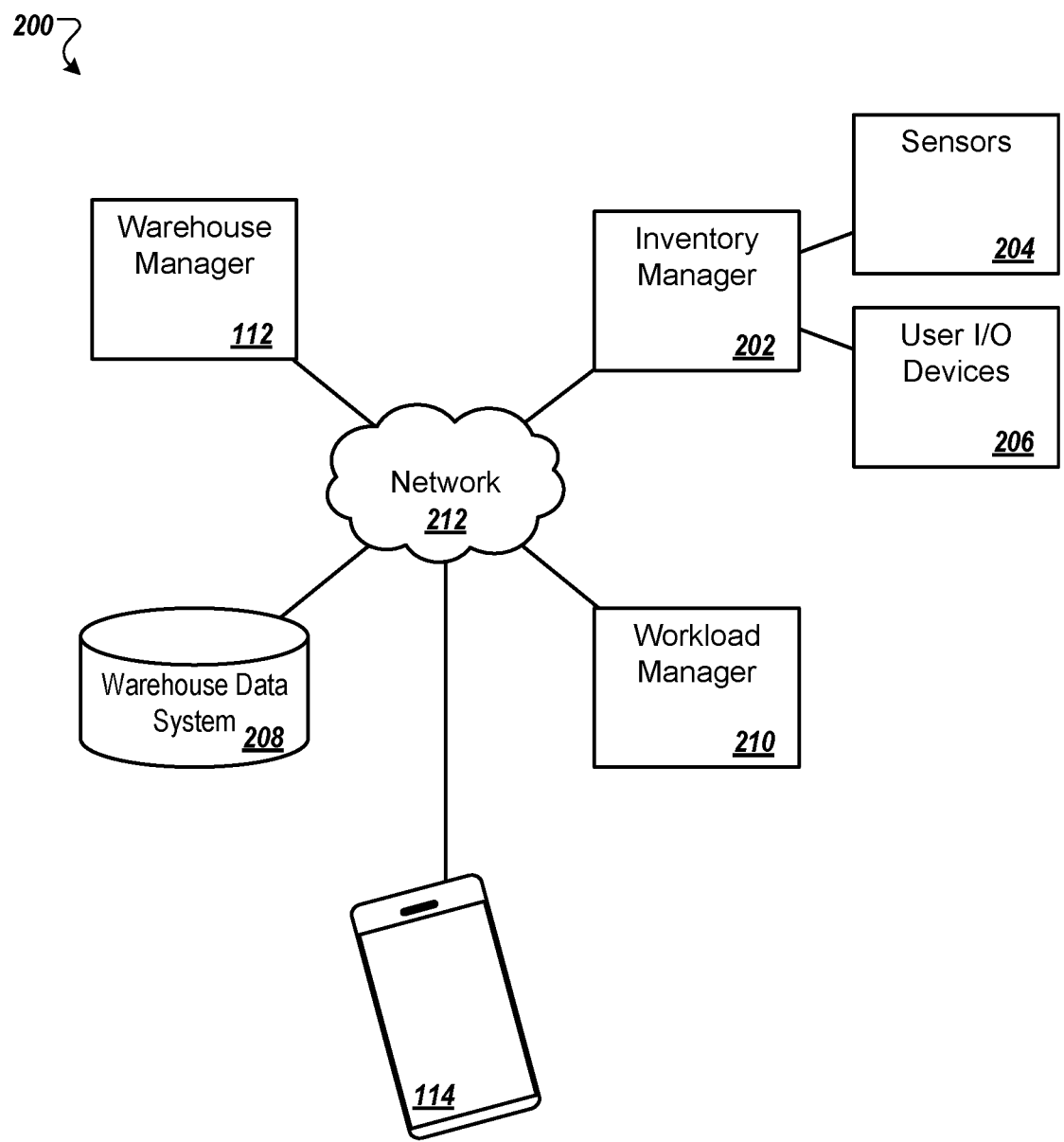
FIG. 2 is a diagram of an example system for managing data in a warehouse system.

FIG. 2 is a diagram of an example system 200 for managing data in a warehouse system. The system 200 can be used with the WMS as described above.

An inventory manager 202 is a computer or computer system or computer that receives signals from multiple sources in order to execute the creation, updating, or deletion of inventory and containers. Input signals could come from various devices including human operated scanners, unmanned sensors like RFID readers, video cameras, barcode scanners, or other system components. Each signal will include identifying data about the physical location, item or container, and/or information about the nature of the activity. The inventory manager 202 can receive these signals and apply logic to translate the signals to updates to the logical inventory container tree. Updates could include the creation of an item or container, the movement of an item or container to another container, a disposition change of an item or container, or the deletion of an item or container.

User I/O devices 206 can be used by the inventory manager 202 to provide output and receive input from users. For example, the user I/O devices 206 can include computers, monitors, keyboards, speakers, computer-mice, tablets and mobile computing devices in data communication with the inventory manager 202. The inventory manager 202 can provide data to a user I/O device 206 (e.g., a GUI) prompting a user to provide input (e.g., entering an item identifier or number of items).

A workload manager 210 can generate work orders using the data model that is stored in the warehouse data system 208. For example, the workload manager 210 may receive a notification that the toothbrushes described above are needed at a different location. In response, the workload manager can access the warehouse data system 208 to determine the logical location of the toothbrushes and to access a logical destination to which the toothbrushes should be moved. The workload manager 210 can generate a series of work orders to be executed (picking the toothbrushes, placing them into a shipping container, placing the shipping container on a trailer, etc.) The work orders can be stored in the warehouse data system 208 and then pushed to user devices 114 of users assigned to the work orders.

Communication for the system 200 can be made through a network 212. The network 212 can include one or more data networks through which elements can pass data messages. The network 212 can be, or can include, the Internet.

As has been described, the warehouse manager 112 and the workload manager 210 are established discretely so that neither element needs to wait on the other. That is, communicating between the two elements takes place asynchronously through the publishing of events to a computer-storage media that can be read within the warehouse data system 208. With the warehouse manager 112 and the workload manager 210 configured to operate without direct communication channels being created or maintained and/or without synchronous communications (that is to say, without waiting for a response or confirmation), the warehouse manager 112 and the workload manager 210 can operate in a way that implicitly assumes the other will operate correctly. This type of configuration provides a number of advantages that overcome possible problems related to computer technology. As will be understood, the warehouse data system 208 can include buffers for other elements of the system 200, may include one or more separate databases, etc.

For example, if the warehouse manager 112 or the workload manager 210 experiences a technical problem and goes off-line for a time, the other element can continue to operate until functionality is restored. This can improve robustness in the face of unexpected downtime and can provide for a less complex upgrade procedure. When one element is upgraded, the other element does not need to also be upgraded. Similarly, this allows for greater scalability. Additional warehouse manager 112 or workload manager 210 instances can be added to the system 200 to handle greater load without needing to notify the other elements.

Figure 3A:
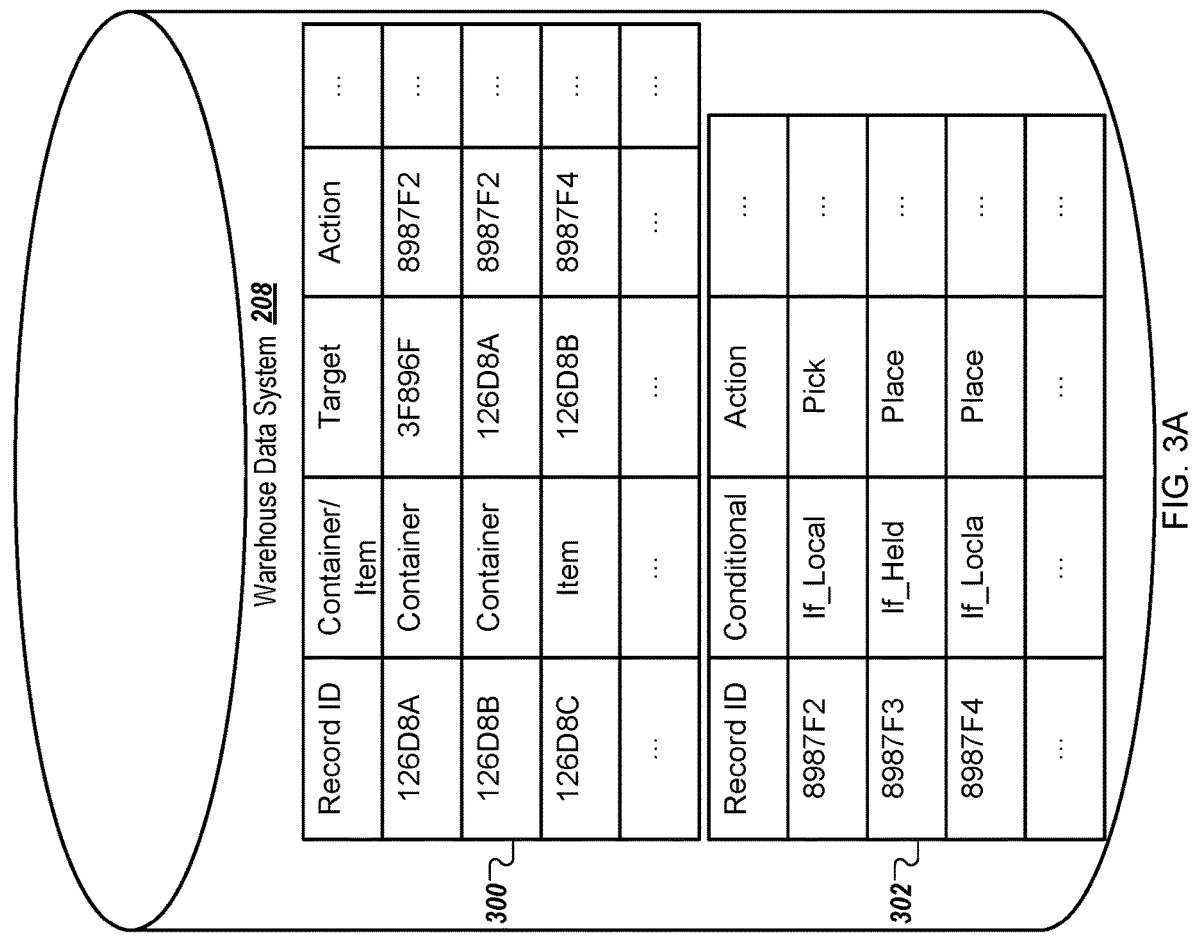

FIG. 3A is a diagram of an example of data used by a warehouse management system. In this example, the data described is stored within the warehouse data system 208 in the form of tables of records, with each record having multiple fields. In this example, each row is a different record and each column is a different field. Other forms of data storage can be used.

A table 300 stores data for a data model of a WMS such as the data model 110. Each record in the table 300 corresponds to an action that occurred involving a specific item or container. Each record references the unique identifier of the impacted item or container and the details of the action that occurred. Actions can include creation of an item or container, movement of an item or container to a different container, change in status of the inventory or container, or the removal of the inventory or container from the system. The action records can be aggregated to determine the current logical state of any given leaf or branch in the item container tree. This allows for historical and current item and container state to be stored concurrently. Additionally, other logical views can be created to answer specific questions of import to system functions. Examples include, "what are the containers in which this item exists," and "what items exist in this container."

As shown here, the data representing the logical location of the item comprises no data explicitly indicating the physical location of the target item. However, other formats for the data are possible, including other formats that may not be easily parsed, that are not sequential, and/or that explicitly indicating the physical location of the target item.

A table 302 stores data for tasks of the WMS such as those generated by the workload manager 210. Each record in the table 300 corresponds to as single task in the WMS. In some examples, each record can contain a tree structure of actions that defines the task. Each task tree has a "point of entry" that indicates how a user or machine would initiate the task. Once initiated, the task tree has a series of possible actions, each triggered by a specific input provided by a human user, machine, or system event. Actions can have validations and next possible actions. Collectively, the point of entry and the actions tree enable the execution of the task and variants of the task.

For example, the task with the "Record ID" of 8987F2 specifies that the task should determine if a conditional function "If Local" returns TRUE or FALSE and, if TRUE, perform a "Pick" action If FALSE, and for operations after the Pick, further columns in the record can specify operations.

When rendered for display on a user device, this task may be displayed using information from the record "8987F2" and from the record for the item "126D8C," with sufficient detail to instruct a user to complete the task. This information may include additional information from the records such as a descriptive name (e.g., "toothbrush"), a photograph, a brand name, a color, or the fully qualified logical location of the item. For example, the task may be displayed as "Pick the ExampleBrand Toothbrush number 126D8C from the bag 126D8B in aisle 126D8A."

FIG. 3B is a diagram of an example of data the can be used by a warehouse management system. The data in FIG. 3B can be used in addition to or in the alternative to the data of FIG. 3A.

A table 350 stores data for a model of a WMS such as the data model 110. Each record in the table 300 corresponds to a single container or a single item in the WMS. Each record includes a data field for a "Record ID." The "Record ID" is a unique identifier that uniquely identifies the record in the table 300. That is to say, no "Record ID" is a duplicate. A data field "Container/Item" stores data that records if the associated contain or item is in fact a container or if it is instead an item. A data field "Containing Container" stores data that records the container that is currently containing the item or container that the record corresponds to. For example, if record 126D8C corresponds to one of the toothbrushes, this record lists the "Containing Container" as 126D8B. The record with the "Record ID" 126D8B corresponds to the bag containing the toothbrush.

Using the table 300, logical locations of items and containers can be identified. In some cases, the logical location can be express a sequence of identifiers that each correspond to containers that contain the item. For example, the logical location of the toothbrush may be expressed as "126D8A\126D8B\126D8C." This string uniquely and fully describes the logical location of the toothbrush in a format that can easily be parsed by a computer processor in order to gain access to the information specifying the logical location. As such, the sequence of identifiers is an ordered sequence of identifiers that represent an ordering of containers around the item.

Figure 4:
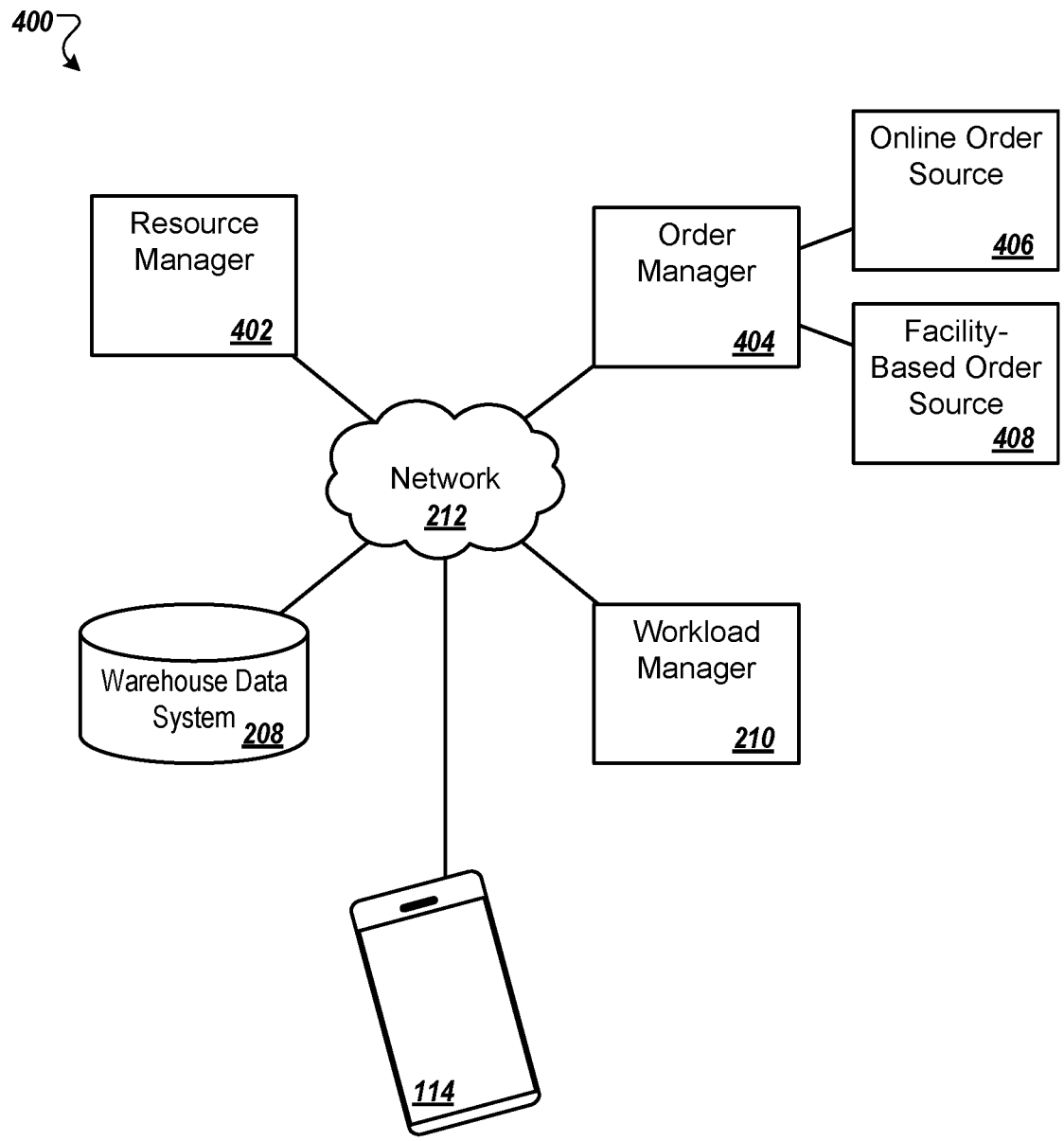
FIG. 4 is a diagram of an example system for workload management.

FIG. 4 is a diagram of an example system 400 for workload management. The system 400 can be used in conjunction with the system 200 for WMS operations, and in fact, the example shown uses some of the same components. It will be understood that implementations of a WMS can include up to all elements of the system 200 and 400 working together for WMS purposes.

The workload manager 210 is responsible for generating tasks for users and resources of the warehouse system. A resource manager 402 is responsible for managing data related to those users and resources. For example, the resource manager 402 can record, in the warehouse data system 208, data identifying employee or user names, job descriptions, scheduling, task capabilities, etc. The resource manager 402 can also or alternatively record, in the warehouse data system 208, data identifying non-human resources. For example, automation system capabilities like size and weight restrictions or operating hours. The resource manager can use this information to determine which work (tasks) to assign to various resources. Resource information can be associated with actual task execution so analysis can be completed on resource proficiency and process defects.

Order data can be managed in the warehouse data system 208 by an order manager 404. Orders can include requests from inside or outside the WMS that request some action to be accomplished. For example, an order for a transfer may be a request to transfer a number of toothbrushes to a different distribution node (e.g., a retail store, a dental clinic) by a specific date. Another type of order is a purchase order. For example, a customer of the retail store may purchase a toothbrush online or at a retail store that is currently out-of-stock, and the order may call for the toothbrush to be moved to the retail store or shipped directly to the customer's home.

Orders can come into the order manager 404 through one or more channels. The order manager 404 can collect the order information into an order pool, which is used to accumulate orders. The accumulation of order in an order pool may be performed, for example, until a systematic or physical event or signal has occurred indicating there is a resource ready to work. At the time of the signal, the order manager 404 can determine what orders should be released for execution based on a number of possible factors including things like priority, resource availability, and logical groupings. The order manager 404 may use information generated, for example, by the resource manager 402.

An online order source 406 can receive orders from online sources (e.g., websites, applications). For example, a customer can purchase a toothbrush from a retail application running on their mobile computing device, or the dental clinic can place an order for delivery of a supply of toothbrushes when the dental clinic's stock is low.

A facility-based order source 408 can receive orders from user input within a facility or from users associated directly with the WMS. For example, one of the users who works for the WMS (and thus has data managed by the resource manager 402) may use a user-interface in a warehouse to generate an order to move assets. For example, the toothbrushes discussed above may be received from a manufacturer at a warehouse, and the user may generate an order to disburse the toothbrushes to different warehouses across the country in preparation for future needs.

The order manager 404 may place data of orders into the warehouse data system 410, and the workload manager 210 can then access the data of the orders and the current inventory and containers available and generate tasks from the order data. For example, in order to complete an order requiring the toothbrush to be moved to a different warehouse, the workload manager 210 can generate tasks to pick the toothbrush in the first warehouse, place the toothbrush in a box on a pallet scheduled to be placed on a trailer, pick the pallet off the trailer at the destination warehouse, and place the pallet in the destination warehouse.

As has been described, the workload manager 210, resource manager 402, and the order manager 404 can be configured so that no element needs to wait on the others. That is, communicating between the elements may take place only indirectly through the transmission of events via the storing and reading of data within the warehouse data system 208 in order to provide a signal that some logical work or processing can proceed. With the workload manager 210, resource manager 402, and the order manager 404 configured to operate without direct communication channels being created or maintained, the workload manager 210, resource manager 402, and the order manager 404 can operate in a way that implicitly assumes the others will operate correctly. This type of configuration provides a number of advantages that overcome possible problems related to computer technology.

For example, if the workload manager 210, resource manager 402, or the order manager 404 experiences a technical problem and goes off-line for a time, the other elements can continue to operate until functionality is restored. This can improve robustness in the face of unexpected downtime and can provide for a less complex upgrade procedure. When one element is upgraded, the other element does not need to also be upgraded. Similarly, this allows for greater scalability. Additional the workload manager 210, resource manager 402, and the order manager 404 instances can be added to the system 200 to handle greater load without needing to notify the other elements.

Figure 5:
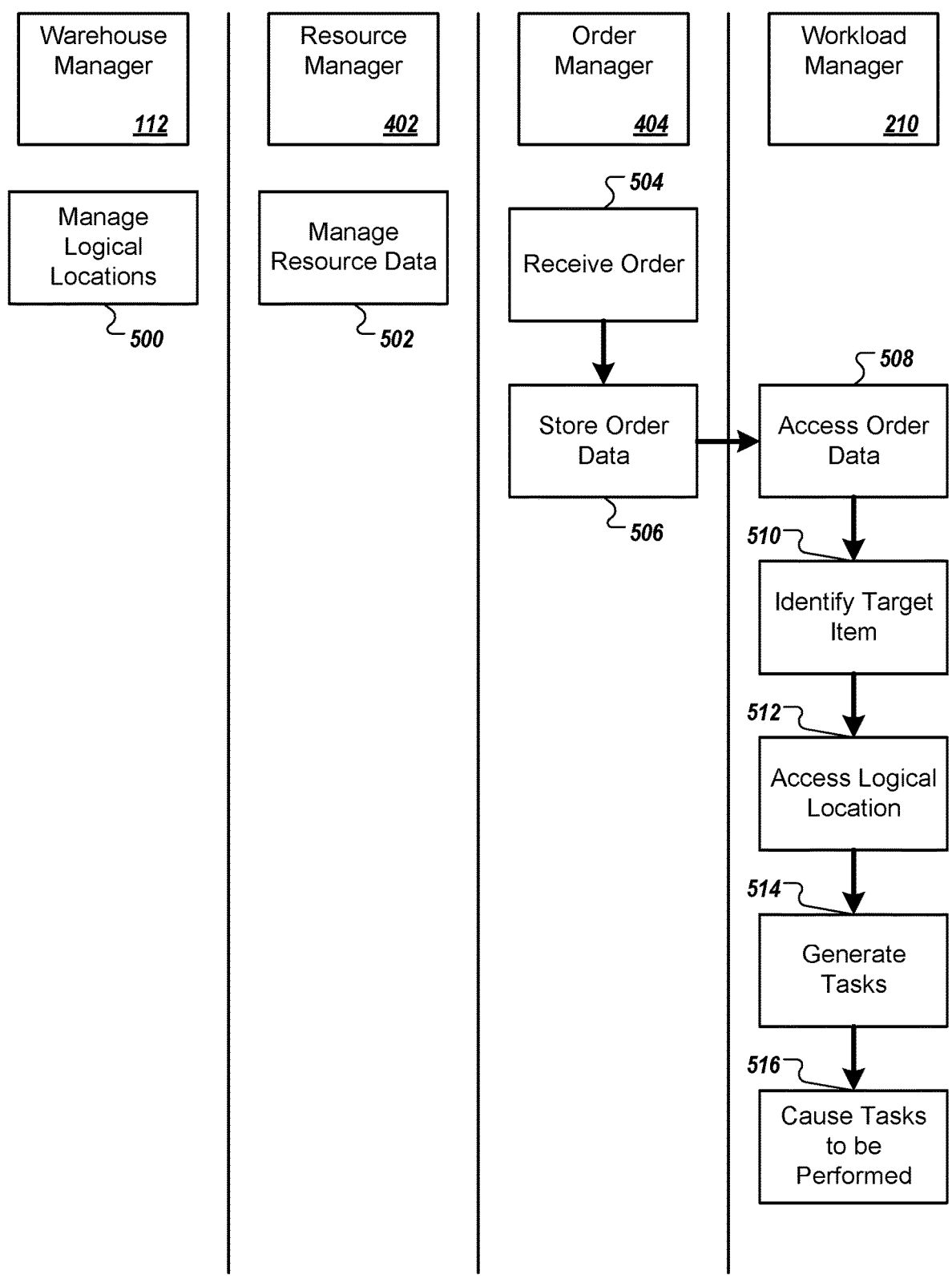
FIG. 5 is a diagram of an example process for physical task generation.

FIG. 5 is a diagram of an example process for physical task generation. The process is shown with reference to elements of the systems 100, 200, and 400. However, other system or systems can be used to perform the process or a similar process.

The warehouse manager 112 manages logical locations 500. For example, the warehouse manager 112 can be used to manage warehouse operations as part of an organization that supplies products to retail stores. The warehouse manager 112 can generate, edit, and delete data records in the warehouse data system 208 as items (e.g., products) and containers of products (e.g., boxes, pallets, bins) are moved through the supply-chain of the retail organization.

As part of this management, the warehouse manager 112 can manage data representing the logical location of the items and containers in the data system without establishing a synchronous request/response interaction with the workload manager 210. For example, the warehouse manager 112 can access the warehouse data system 208, and the workload manger 210 can access and respond to events published by the warehouse manager 210 in the data system 208, but no direct data communication sent from the warehouse manager 112 is sent to the workload manager 210 or vice-versa.

The resource manager 402 manages resource data 502. For example, the resource manager 402 can be used to manage human and non-human resources of the retail organization. The resource manager 402 can generate, edit, and delete data records in the warehouse data system 208 as people and non-human resources are used (e.g., hired, starting a work shift, non-human resources are acquired and labeled.)

The order manager 404 receives an order requiring an item to be moved to a first physical location 504. For example, a customer of the retail organization can place an order through the online order source 406 to purchase an item for sale. The order manager 404 can receive this order request and group the order with other orders using several optimization factors. When signaled by a resource available to work or a scheduled event in the system, the order manager will release orders to be executed by the workload manager 210.

The order manager 404 stores data of the order in a data system that is in data communication with the order manager 506. For example, the record can be sent to the warehouse data system 208 through the network 212 for storage.

The workload manager 210 accesses the data for the orders 508. For example, the workload manager 210 can generates the appropriate tasks to fulfill the order. The workload manager 210 identifies, in the data for the order, a target item matching the required item to be moved to the first location 510. For example, the workload manager 210 can search within table 300 for a record or records that match the parameters of the required item (e.g., shoes of the required type, in size 7) and select one of those (e.g., the search result geographically closest to the Store number 123) as the target item. The "Record ID" of the target item may be stored by the workload manger 210 for future use in completing this order.

The workload manager 210 accesses, from the data system, data representing a logical location of a target item 512. For example, the workload manager 210 can search within the table 300 or aggregations of the item container data for the sequence of "Containing Container" that are of containers containing the recorded "Record ID" value. This sequence of values can be assembled into the data representing the logical location of the target item.

The workload manager 210 generates, based on the data representing the logical location of the target item, one or more tasks that are configured to move the target item to the first location 514. For example, the workload manager 210 can generate a pick request for a container containing the shoes (e.g., a shippable box containing five pairs of shoes including the target shoes) and a place request to place the container onto a trailer that is scheduled to be shipped to the target store (e.g., Store number 123). These two tasks may be assigned to a single person, multiple people, or possibly to a material-handling piece of equipment such as an automated cart or a conveyor.

The workload manager 210 generates, for each of the tasks, a record that describes the tasks and steps and validations required to execute the task and all its variants.

The workload manager 210 causes the tasks to be performed 516. For example, the workload manager 210 can generate a message to be routed to a mobile computing device 114 with the records of the tasks assigned to that user, or with an indication that the records are available in the warehouse data system 208. The mobile computing device 114 can present the task information to a user for completion.

Figure 6:
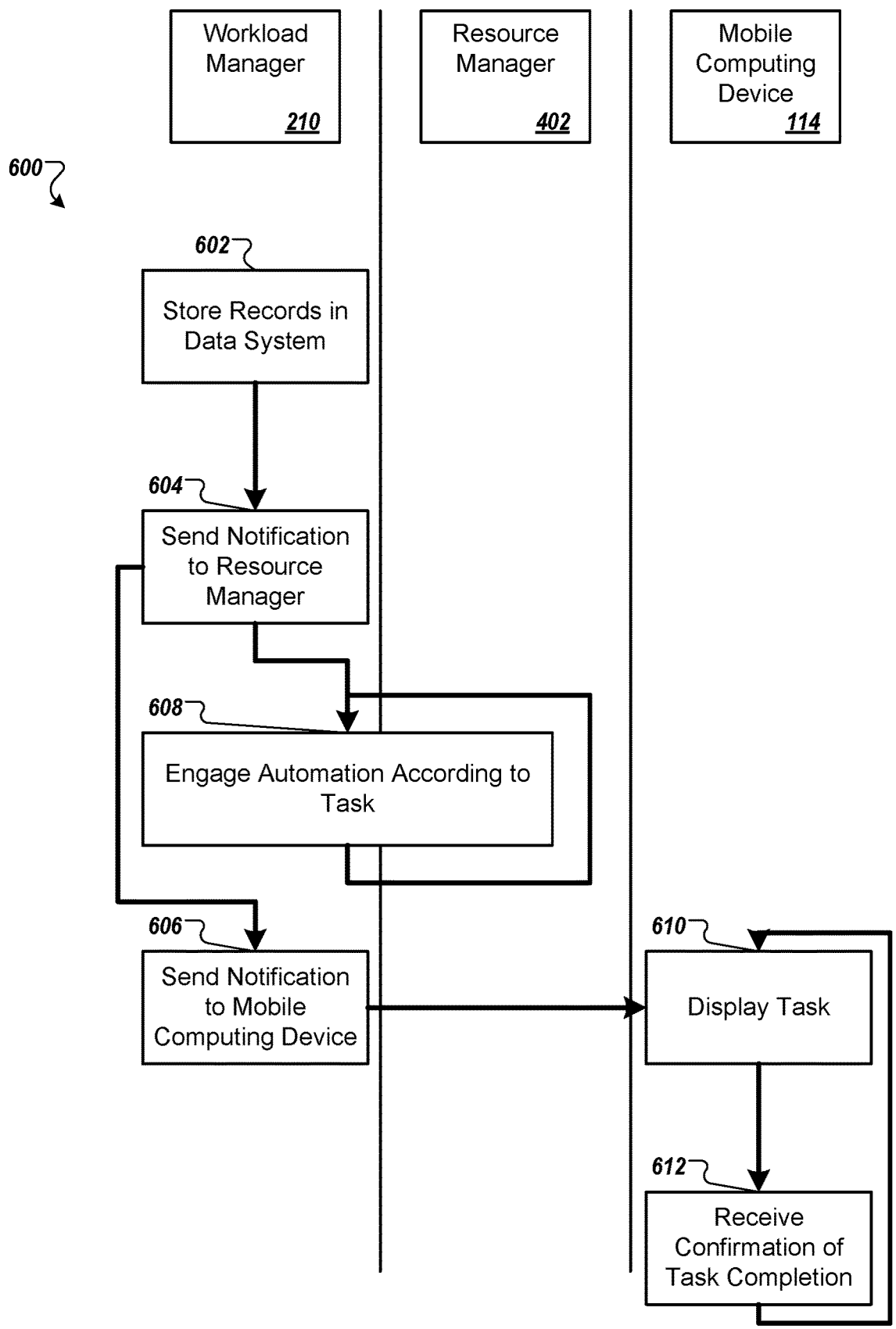
FIG. 6 is a diagram of an example process for physical task completion.

FIG. 6 is a diagram of an example process 600 for physical task completion. The process 600 may be used, for example, as part of causing tasks to be performed 516. The process 600 is shown with reference to elements of the systems 100, 200, and 400. However, other system or systems can be used to perform the process 600 or a similar process.

The workload manager 210 stores 602 records in the warehouse data system 208. For example, the workload manager 210 can generate one or more records that, when executed, will result in the shoes discussed above to be shipped to the store specified by the customer's order. Some of these records are for an automated device to activate, namely a package-handling conveyor is instructed to move a box containing the shoes from storage shelves to a pick-up area accessible by a user. Some of these records are for a human user to perform, namely for the human to retrieve the box and load it onto a waiting trailer.

The workload manager 210 can send the records to the warehouse data system 208 through the network 212. Upon receipt, the warehouse data system 208 can store the received records and make the store records available to authenticated and validated requestors such as other elements of the systems 100, 200, and/or 400.

The workload manager 210 sends 604 a notification to the resource manager 402. For example, the workload manager 210 can send a message through the network 212 with information about the task to be automated. In some implementations, the sending can be directly to the resource manager 402 through the network 212. In some implementations, the message may be sent to the warehouse data system 208, where the workload manager can listen for new records.

The workload manager 210 sends 606 a notification to the mobile computing device 114. For example, the workload manager 210 can send a message through the network 212 with information about the tasks to be performed by a human user. In some implementations, the sending can be directly to the resource manager 402 through the network 212. In some implementations, the message may be sent to the warehouse data system 208, where the workload manager can listen for new records.

The workload manager 210 engages automation according to the task 608 and resources able to complete the task with the resource manager 402. For example, the workload manager 210 can issue commands to the material-handling device in a format and computer-language that is used by the material handling device to cause the material-handling device to behave as required by the task, resulting in the box of shoes made available at the pick-up location. If multiple tasks are required, this engagement can be repeated.

The mobile computing device 114 displays a task 610. For example, a GUI on the mobile computing device 114 can display a list of tasks to be completed by the user that is to complete the corresponding task. The first task to be completed can be displayed at the top of the list, with subsequent tasks displayed. Below.

The mobile computing device 114 receives confirmation of task completion 612. For example, after the user picks up the box and places it on the trailer, the user may tap on the screen or scan a code on the box to indicate that the task is completed.

Figure 7:
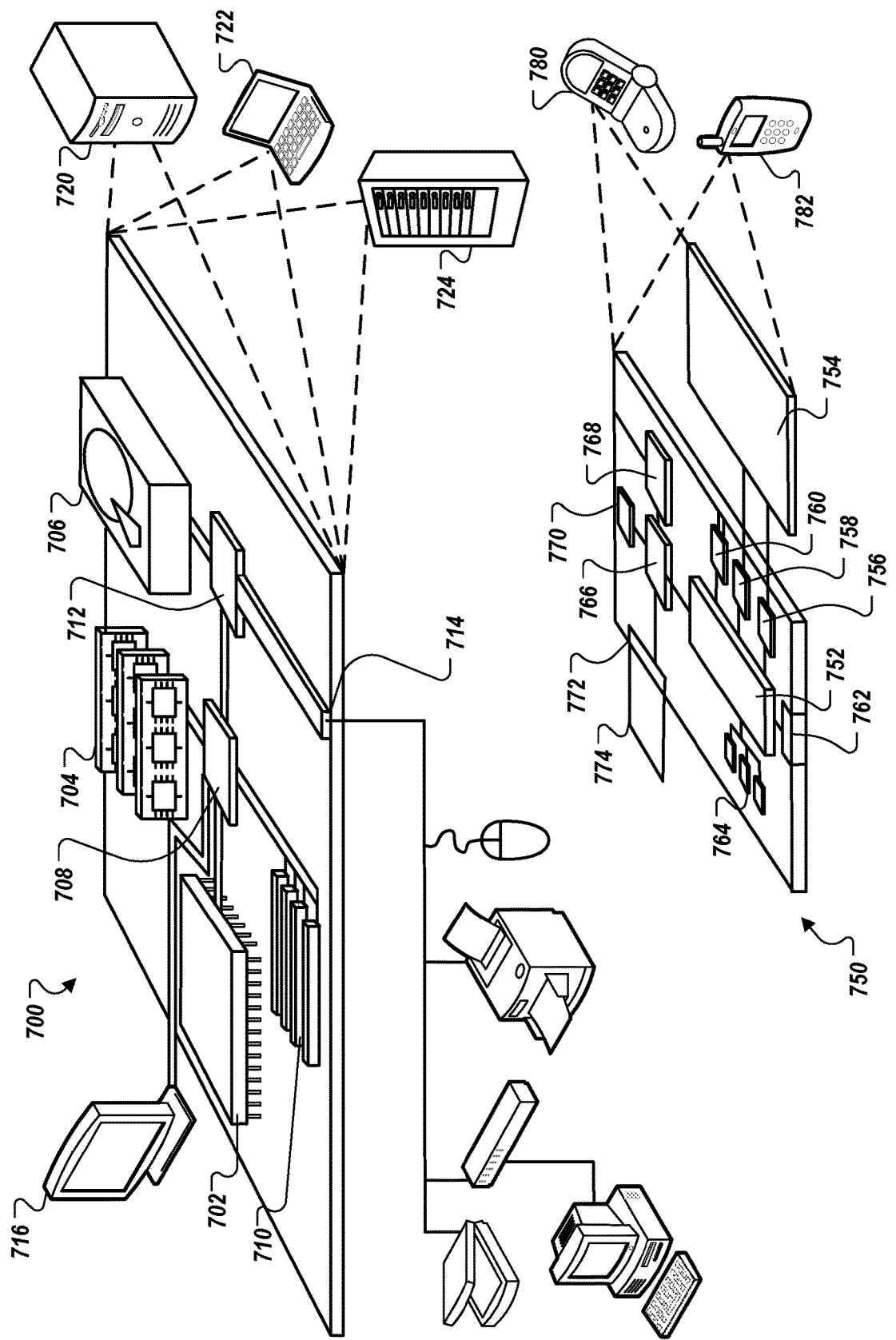
FIG. 7 is a schematic diagram that shows an example of a computing system.

FIG. 7 shows an example of a computing device 700 and an example of a mobile computing device that can be used to implement the techniques described here. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MIMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Figure 8A:
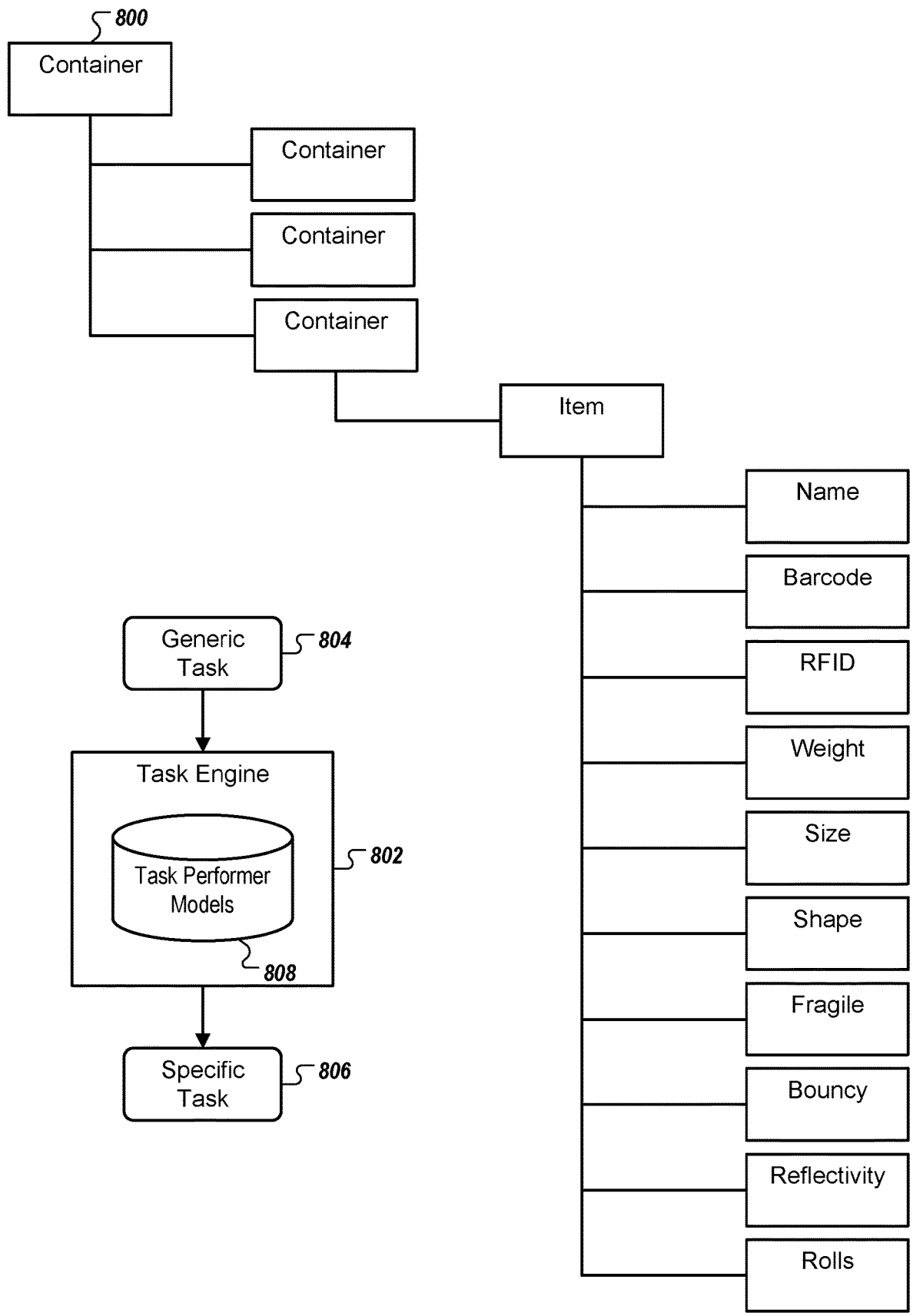
FIG. 8A is a diagram of example data used to describe an item used in a task.

FIG. 8A is a diagram of example data 800 used to describe an item used in a task. Items may be tracked using the data 800 to record the logical locations of items being tracked. For example, the data 800 may be organized into a tree structure, with nodes in the tree representing nested containers and items located in the containers. As shown here, items can have recorded one or more data fields that describe the item.

For example, if the item in the data 800 is a toothbrush, the data 800 can record data fields for name (e.g., brand name), barcode value (e.g., a UPC encoded value), an RFID value (e.g., an RFID address), a weight (e.g., in a unit of force or mass), a size (e.g., a volumetric measure), a shape (e.g., out of a list of possible shapes), a fragile value (e.g., a Boolean representing if the item must be handled with care), a bouncy value (e.g., a Boolean representing if the item will bounce) a reflectivity value (e.g., a Boolean representing if the item is partially or completely reflective) and a rolls value (e.g., a Boolean representing if the item will roll or not). Different properties may be used.

These properties may be consulted when a system is determining if a particular automation system can handle movement of a particular item. For example, a conveyor belt may be able to handle only items that do not roll, and a system with optical recognition may be able to handle only items that are not reflective. As such, the data 800 may be used when determining if an item for a task can be handled by an automation system, or should be handled by a user.

While not shown for clarity, other data may be included in the data 800. For example, each container may also have a similar or identical list of properties. Different types of items may be the same or different properties. Some properties may be empty or null, etc.

The data 800 can be stored in memory-efficient formats. For example, instead of storing redundant property data for each copy of a similar item, a single list of properties may be stored for an item type (e.g., a particular type of toothbrush). Then, each instance of the item type stored in the data (e.g., each copy of the particular type of toothbrush) may reference the properties for the item type. This may be accomplished by using one of the properties shown as a unique key (e.g., the barcode) or may be done with a reference that is not included in the properties shown.

The data 800 may be used by a task engine 802 to convert generic tasks to specific tasks for a given item. For example, the task engine 802 may store, for each generic task, one or more task performer models in a model datastore 808. The task specific models 808 can record how a particular task performer can perform various tasks. For example, for a conveyor belt, the model datastore 808 may store a model for how a pick operation is completed, for how a place operation is completed, for how a movement operation is completed, etc. These models may also include one or more constraints that define item properties that are compatible or incompatible with the automation device. For example, the conveyor belt may be incompatible with objects that are bouncy or roll, and may store data recording as such.

The task engine 802 can receive a generic task 804 and can receive data 800 for an item on which the task is to be performed. The task engine can apply the generic task 804 and the data 800 to one or more (e.g., all) applicable models in the model datastore 808 to generate the specific tasks 806. Each of these specific tasks 806 can include valid performer-specific instructions for executing a task. For example, for a human worker, the specific task 806 may include a list of actions (pick, place, etc.) to be performed on items and containers as identified by barcode values for the items and containers. For an automation-type performer, the specific task 806 can include computer-readable code and/or instructions in a format usable by the automation performer.

Figure 8B:
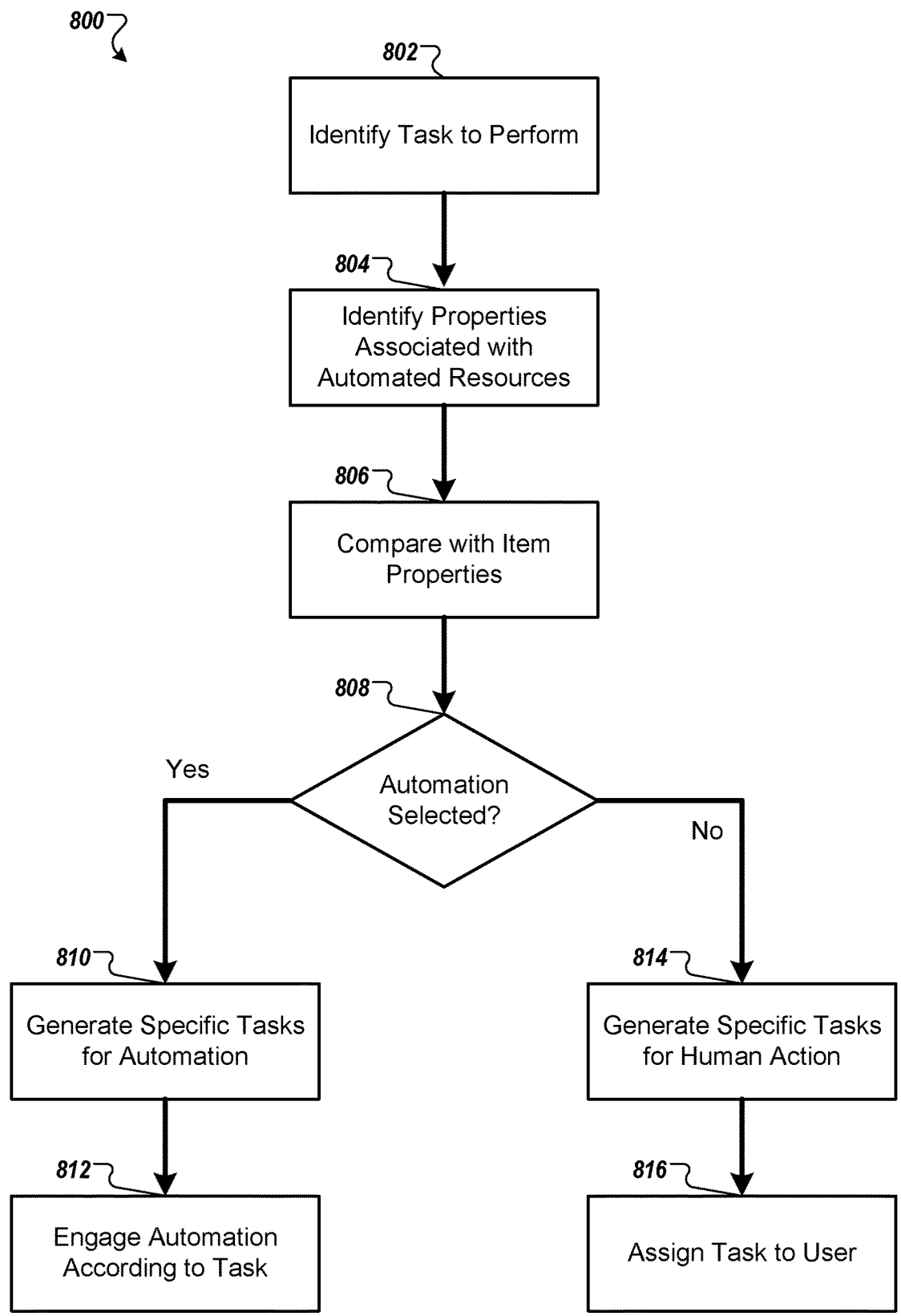
FIG. 8B is a diagram of an example process for physical task generation.

FIG. 8B is a diagram of an example process 850 for physical task generation. The process 850 can be performed by, for example, elements of the systems described in this document. However, other systems may be used to perform the same or a similar process.

A task to be performed is identified 802. For example, the workload manager 210 may receive or generate data that requires at least one task to be performed. This may include the requirement to move at least one item from the item's current physical locations, as defined by a first logical location, to another physical location, defined by a second logical location. As such, the task can define, for example, an item, a beginning location, and a final location, and multiples thereof, depending on the task.

Properties associated with automated resources are identified 804. For example, various facilities (e.g., warehouses, fulfilment centers, stores, cargo containers) can have different automation and human-worker capabilities. In one location, material handling conveyors and automated carts can be used to move items, while at another location only human workers are available for moving items, while at a third a different mix of capabilities are present, etc. A resource manager 402 can make available to the process 800 a list of capabilities that are available at a location of the task. This list of capabilities may include a list of compatible properties and/or incompatible properties (i.e., a conveyor cannot handle bouncy items, human workers cannot handle hazardous material or a conveyor can handle items up to a particular size, human workers can handle delicate items).

The automated resources properties are compared with item properties 806. For example, the properties of the item can be compared to determine if they meet the list of compatible properties for a given automation or human worker, and/or the properties can be compared to determine if the item has any incompatible properties. From this, a list of possible automation and human performers can be generated that each is capable (e.g., physically capable, legally capable) of performing the task.

Automation or human performers are selected 808. Rulesets and/or user intervention can be used to assign the task to one of the possible performers. For example, a ruleset may be used to identify the performer that has the shortest queue of work to be completed and assign the task to that performer. A user with knowledge of the facility may select a performer out of the list of possible performers based on their judgement. A performer with the lowest overall cost may be selected. Other criteria may be used.

If automation is selected, automation specific tasks for automation are generated 810 and automation is engaged according to the task 812. For example, a task engine 802 may use the task as a generic task 804 and apply the generic task 804 to a test performance model 808 to generate a specific task 806 for the selected automation. The specific task 806 may then be sent to the corresponding automation device, and the automation device can use the specific task 806 to physically move or otherwise manipulate the item as specified in the task.

If automation is not selected, human-action-specific tasks are generated 814 and users are assigned the task 816. For example, the task engine 802 may use the task as a generic task 804 and apply the generic task 804 to a test performance model 808 to generate a specific task 806 for a human performer. Instructions for the specific task 806 may then be sent to one or more user devices for instructing the user or users to perform the task.

Figure 9:
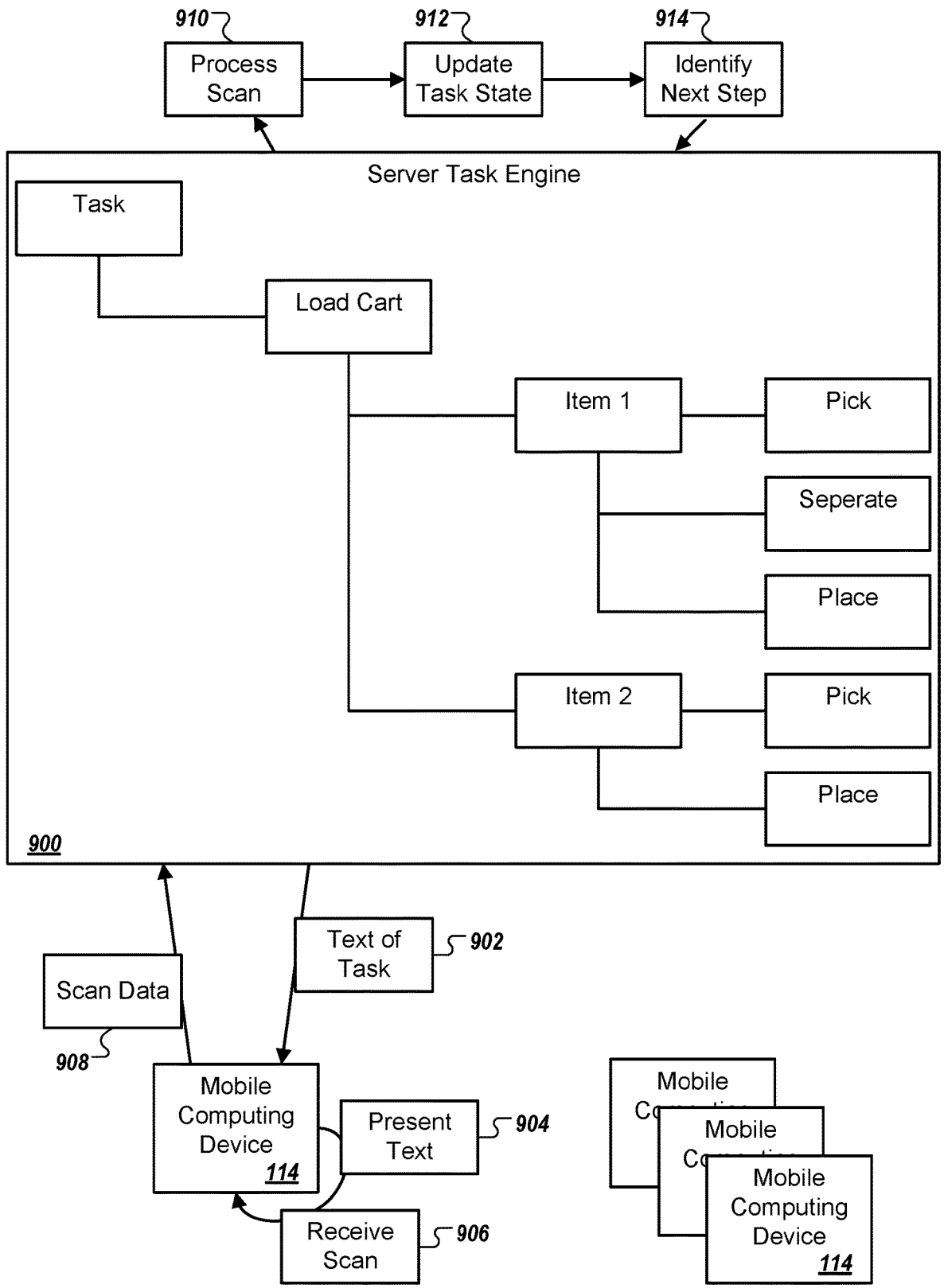
FIG. 9 is a diagram of example data used when executing a physical task.

FIG. 9 is a diagram of example data 900 used when executing a physical task. For example, the data 900 can be used when a task is performed by a human performer using a mobile computing device 114 in communication with a server task engine that is hosting the data 900.

The data 900 can define the task in terms of a tree of sub-tasks. For example, the task in the data 900 may include a sub-task to load two items into a cart (shown) and sub-tasks to move and unload the items from the cart (not shown). The sub-task to load the cart may include sub-tasks, which are then divided into sub-tasks, etc. Some of the sub-tasks, which may in some cases be represented as leafs in the tree, may define the sub-tasks in terms of a human operation such as pick (to pick up an item), place (to place an item somewhere), separate (to separate a bundle), etc.

In this example, the state of the task is maintained and updated by the server task engine in the data 900. Data can be sent to and received from the mobile computing devices 114 to, for example, instruct a user to perform an operation or to receive confirmation that the user has done so. In such a configuration, a number of advantages may be realized.

For example, the sub-tasks of the tasks may be performed in parallel by two or more different performers. The two performers may both be human performers, or they may be a mix of human and automation performers. With the state of the task maintained by the server task engine, loss or damage of a mobile computing device 114 need not result in the loss of state of a task. Further, updates to the technology can be made at one central location instead of on each mobile computing device 114.

To execute the task with one or more human performers, the server task engine can send 902 the text for a task to the mobile computing device 114. For example, the server task engine can send, to the mobile computing device 114, a message with an instruction generated from a parsing of the data 900. The instruction can use the name or associated instruction of sub-tasks, of items associated with a sub-task, and of logical locations of sub-tasks. For example, the message may include an instruction to pick a toothbrush from bin 1, shelf a, to separate the toothbrush from its bundle, and to place it in cart alpha.

The mobile computing device 904 can present the text to the user of the mobile computing device 114 and the mobile computing device can receive a scan 906. For example, the mobile computing device can display text in a user interface with human-readable instructions to pick a toothbrush from bin 1, shelf a, to separate the toothbrush from its bundle, and to place it in cart alpha. The human performer can perform this task, and indicate a completion by scanning a barcode on the cart alpha once completed.

The mobile computing device can send the scan data to the server task engine 908. For example, the mobile computing device 114 can decode the scanned barcode, or receive the decoded value from a communicably coupled scanner, and can package this data into a message to send to the server task engine.

The server task engine can process the scan 910. For example, the server task engine can receive the scan data and compare it to an expected scan result. If the scan is different from the scan result, the server task engine can request correction from the user by sending another message to the mobile computing device 114. If the scan data is an expected value, the server task engine can update the task state 912. For example, one or more (in this example, three) sub-tasks can be flagged as completed. If appropriate, other data can be updated. For example, the data 800 that records the logical location of the toothbrush may be updated to reflect the toothbrush's location in cart alpha.

The server task engine can identify the next step 914. For example, with these sub-tasks completed, the server task engine can identify one or more additional sub-tasks to be performed. If, while the toothbrush is placed in cart alpha, another performer moves a tube of toothpaste into cart alpha (Item 2 shown), the server task engine can select the next sub-task (not shown) to be performed, or may determine that the task is complete.

What is claimed is:

1. A method for operating components of a warehouse management system, the method comprising:
receiving, by an order manager of the warehouse management system, an order requiring an item to be moved to a first physical location, the warehouse management system further comprising a workload manager, a data system, and a plurality of order sources, the warehouse management system arranged such that:
the workload manager, the data system, the plurality of order sources, and the order manager operate independently of each other;

the order sources are in communication with the order manager;

the order manager asynchronously publishes in the data system;

the workload manager asynchronously accesses contents of the data system;

asynchronously publishing data of the order in the data system;

asynchronously accessing, by the workload manager, the data for the order;

identifying, by the workload manager in the data for the order, a target item matching the required item to be moved to the first location;

asynchronously accessing, by the workload manager from the data system, data representing a logical location of a target item, the data representing the logical location of the target item comprising a first specification of nested containers for the target item recorded as a sequence of other containers defining the nesting;

generating one or more tasks comprising i) data representing a second specification of nested containers defining a target logical location of the target item to be moved by the tasks, and ii) for the target item, data about physical properties of the item independent of the second specification, by the workload manager and based on i) the data representing the logical location of the target item, ii) the data representing the second specification, and iii) the data about physical properties of the target item, that are configured to move the target item to the first location; wherein the generating comprises i) selecting, from a plurality of possible performers, a performer to perform the task based on a match between the performer and the data about physical properties of the target item; and ii) generating, from the one or more tasks, instructions for the performer; and causing, by the workload manager, the one or more tasks to be performed.

2. The method of claim 1, wherein the data representing the logical location of the target item comprises no data explicitly indicating the physical location of the target item.

3. The method of claim 1, wherein data representing the logical location of the target items is managed in the data system by a warehouse manager that is in data communication with the data system and not in data communication with the workload manager.

4. The method of claim 1, wherein generating, by the workload manager and based on the data representing the logical location of the target item, one or more tasks that are configured to move the target item to the first location comprises:

generating, for each of the one or more tasks, a record in the data system that identifies at least one action to be performed for the one or more tasks.

5. The method of claim 1, the method further comprising causing data of the one or more tasks to be displayed to a user that is to complete the one or more tasks.

6. The method of claim 5, the method further comprising:

receiving, from a user device that displayed the data of the one or more tasks, a message confirming completion of a portion of the one or more tasks; and updating, responsive to receiving the message confirming completion of the portion of the one or more tasks, a state of the one or more tasks.

7. The method of claim 1, wherein the method further comprising pooling the order with other orders into an order pool to be performed together.

8. The method of claim 1, wherein each of the workload manager, the data system, the plurality of order sources, and the workload manager operate on different computing hardware.

9. The method of claim 1, wherein each of the order manager, the data system, and the workload manager is configured to continue to operate while others of the order manager, the data system, and the workload manager are off-line for a period of time.

10. A system comprising:

a processor;

computer memory containing instructions that, when executed with the processor, cause the system to perform operations comprising:

receiving, by an order manager of a warehouse management system, an order requiring an item to be moved to a first physical location, the warehouse management system further comprising a workload manager, a data system, and a plurality of order sources, the warehouse management system arranged such that:

the workload manager, the data system, the plurality of order sources, and the order manager operate independently of each other;

the order sources are in communication with the order manager;

the order manager asynchronously publishes in the data system;

the workload manager asynchronously accesses contents of the data system;

asynchronously publishing data of the order in the data system;

asynchronously accessing, by the workload manager, the data for the order;

identifying, by the workload manager in the data for the order, a target item matching the required item to be moved to the first location;

asynchronously accessing, by the workload manager from the data system, data representing a logical location of a target item, the data representing the logical location of the target item comprising a first specification of nested containers for the target item recorded as a sequence of other containers defining the nesting;

generating one or more tasks comprising i) data representing a second specification of nested containers defining a target logical location of the target item to be moved by the tasks, and ii) for the target item, data about physical properties of the item independent of the second specification, by the workload manager and based on i) the data representing the logical location of the target item, ii) the data representing the second specification, and iii) the data about physical properties of the target item, that are configured to move the target item to the first location; wherein the generating comprises i) selecting, from a plurality of possible performers, a performer to perform the task based on a match between the performer and the data about physical properties of the target item; and ii) generating, from the one or more tasks, instructions for the performer; and causing, by the workload manager, the one or more tasks to be performed.

11. The system of claim 10, wherein the data representing the logical location of the target item comprises no data explicitly indicating the physical location of the target item.

12. The system of claim 10, wherein data representing the logical location of the target items is managed in the data system by a warehouse manager that is in data communication with the data system and not in data communication with the workload manager.

13. The system of claim 10, wherein generating, by the workload manager and based on the data representing the logical location of the target item, one or more tasks that are configured to move the target item to the first location comprises:
generating, for each of the one or more tasks, a record in the data system that identifies at least one action to be performed for the one or more tasks.

14. The system of claim 10, the operations further comprising causing data of the one or more tasks to be displayed to a user that is to complete the one or more tasks.

15. The system of claim 10, the operations further comprising pooling the order with other orders into an order pool to be performed together.

16. A non-transitory computer-readable medium containing instructions that, when executed with a processor, cause the performance of operations comprising:
receiving, by an order manager of a warehouse management system, an order requiring an item to be moved to a first physical location, the warehouse management system further comprising a workload manager, a data system, and a plurality of order sources, the warehouse management system arranged such that:
the workload manager, the data system, the plurality of order sources, and the order manager operate independently of each other;
the order sources are in communication with the order manager;
the order manager asynchronously publishes in the data system;
the workload manager asynchronously accesses contents of the data system;
asynchronously publishing data of the order in the data system;
asynchronously accessing, by the workload manager, the data for the order;
identifying, by the workload manager in the data for the order, a target item matching the required item to be moved to the first location;
asynchronously accessing, by the workload manager from the data system, data representing a logical location of a target item, the data representing the logical location of the target item comprising a first specification of nested containers for the target item recorded as a sequence of other containers defining the nesting;
generating one or more tasks comprising i) data representing a second specification of nested containers defining a target logical location of the target item to be moved by the tasks, and ii) for the target item, data about physical properties of the item independent of the second specification, by the workload manager and based on i) the data representing the logical location of the target item, ii) the data representing the second specification, and iii) the data about physical properties of the target item, that are configured to move the target item to the first location; wherein the generating comprises i) selecting, from a plurality of possible performers, a performer to perform the task based on a match between the performer and the data about physical properties of the target item; and ii) generating, from the one or more tasks, instructions for the performer; and
causing, by the workload manager, the one or more tasks to be performed.

* * * * *